US012225850B2

(12) United States Patent
Mezzano (10) Patent No.: US 12,225,850 B2
(45) Date of Patent: Feb. 18, 2025

(54) CORN HARVESTER HEADER WITH FRONTAL GUIDING ELEMENTS FOR CROP ALIGNMENT

(71) Applicant: MAIZCO S.A.I. Y C., Córdoba (AR)

(72) Inventor: Franco Alex Mezzano, Arias (AR)

(73) Assignee: MAIZCO S.A.I. Y C., Córdoba (AR)

( * ) Notice: Subject to any disclaimer, the term of this patent is extended or adjusted under 35 U.S.C. 154(b) by 611 days.

(21) Appl. No.: 16/972,477

(22) PCT Filed: Jun. 5, 2019

(86) PCT No.: PCT/EP2019/064681
§ 371 (c)(1),
(2) Date: Dec. 4, 2020

(87) PCT Pub. No.: WO2019/234111
PCT Pub. Date: Dec. 12, 2019

(65) Prior Publication Data
US 2021/0267123 A1  Sep. 2, 2021
US 2022/0174876 A9  Jun. 9, 2022

(30) Foreign Application Priority Data

Jun. 7, 2018 (AR) .............................. P180101535

(51) Int. Cl.
*A01D 45/02* (2006.01)
*A01D 57/22* (2006.01)

(52) U.S. Cl.
CPC ........... *A01D 45/023* (2013.01); *A01D 57/22* (2013.01); *A01D 45/025* (2013.01)

(58) Field of Classification Search
CPC .. A01D 45/023; A01D 45/021; A01D 43/083; A01D 57/22; A01D 45/02–45/028
See application file for complete search history.

(56) References Cited

U.S. PATENT DOCUMENTS 1,063,201 A * 6/1913 Jacobs ................. A01D 45/021
56/119
1,727,021 A * 9/1929 Van Nortwick ..... A01D 45/021
56/104
(Continued)

FOREIGN PATENT DOCUMENTS

AR         074937 A1      2/2011
DE     198 15 571 A1     10/1999
(Continued)

OTHER PUBLICATIONS

English translation of document AR 074937 A1 referred to on pp. 3-4 of International PCT Publication WO 2019/234111 A1 (12 pages).

(Continued)

*Primary Examiner* — Adam J Behrens
*Assistant Examiner* — Madeline I Runco
(74) *Attorney, Agent, or Firm* — Crowell & Moring LLC (57) ABSTRACT

This invention reveals a corn harvester header comprising: multiple harvesting units placed adjacently among them, where each of said harvesting units has a central slot through where a maize plant is processed to separate the ears from the stalks; multiple crop divisors, each placed between two adjacent harvesting units; and multiple frontal devices, each place in front of and between two adjacent harvesting units; where each one of said multiple frontal devices comprise: a pair of guiding elements, where the guiding element is selected from a group of: chain or belt; two or more wheels; and a support; where the guiding element is placed around said two or more wheels; where one of the two or more wheels drives the spin of the guiding element, where the tangential speed of the guiding element is configured according to the distance between the plants in the crop; and where an opening greater that the harvesting slot is created.

7 Claims, 10 Drawing Sheets

(56) References Cited

U.S. PATENT DOCUMENTS

| | | | | |
|---|---|---|---|---|
| 3,127,723 | A | * | 4/1964 | Procter .................. A01D 57/00 56/DIG. 1 |
| 4,539,799 | A | * | 9/1985 | Kalverkamp ........ A01D 45/021 56/106 |
| 10,021,832 | B2 | * | 7/2018 | Wenger .................. A01D 65/00 |
| 2011/0041472 | A1 | | 2/2011 | Rottinghaus |
| 2015/0068179 | A1 | | 3/2015 | Lambertini |
| 2015/0319929 | A1 | | 11/2015 | Hendrickson et al. |
| 2017/0055447 | A1 | * | 3/2017 | Missotten ............ A01D 45/025 |
| 2017/0238467 | A1 | | 8/2017 | Gessel et al. |
| 2017/0280620 | A1 | * | 10/2017 | Desai .................. A01D 41/127 |
| 2018/0139902 | A1 | | 5/2018 | Walker et al. |

FOREIGN PATENT DOCUMENTS

| | | | |
|---|---|---|---|
| EP | 2 862 433 A1 | 4/2015 | |
| EP | 3143864 B1 * | 8/2018 | ........... A01D 45/021 |

OTHER PUBLICATIONS

International Search Report (PCT/ISA/210) issued in PCT Application No. PCT/EP2019/064681 dated Aug. 23, 2019 (four (4) pages).

Written Opinion (PCT/ISA/237) issued in PCT Application No. PCT/EP2019/064681 dated Aug. 23, 2019 (five (5) pages).

* cited by examiner

--Prior art--

FIG. 1

--Prior art--

CORN HARVESTER HEADER WITH FRONTAL GUIDING ELEMENTS FOR CROP ALIGNMENT

BACKGROUND

The corn harvester header has several mechanisms which raise the fallen plants and separate the stalks from the corn, strip most of the non-kernel material and take the corn to the kernel feeder in the harvester machine. Among the component parts are the chassis, the collection unit, the conveyor belt, and the crop divisors.

As the harvester moves on the field, the crop divisors enter the corn rows and each plant is taken by the rotating snapping rolls, the surface of which has longitudinal splines resembling a pair of cogged gearwheels Therefore each stalk entering said rolls is dragged down, separating the ear (with diameter bigger than the stalks) from the rest of the plant by passing through two smooth metal plates placed with their straight edges parallel between them, called deck plates These build a channel wide enough for the stalk to go through, but too narrow for the ears to pass, and then it is stripped.

Once the ear is stripped, it is taken by two gatherer chains which lead ears, husks and some loose stalks toward the conveyor feeder. For this action to be done, a synchronicity of relative speeds between the advance and the tangential speed of rolls and chains must be achieved.

The crop dividers purpose is to guide or channel the plants toward the gatherer chains and the snapping rolls (fallen crops, unaligned crops, etc.). They must be able to "penetrate" below the fallen plants, and deliver them individually and erect to the rolls. They must have a reduced penetration angle and good height in the rear.

Meanwhile, the gathering chains transport the ears toward the conveyor, for which they have attachments that in fallen crops collaborate with the divisors to transport the plants toward the rolls. The distance between one attachment and the next must allow for an ear to pass through longitudinally to the chain so therefore it can be successfully carried toward the conveyor. The input channel must be wide between the divisors so as the chains can be uncovered and grasp the plant.

Two snapping rolls per row spin concentrically pulling the plant downwards to prevent it (or parts of it) from entering along the ear into the harvester. The snapping rolls are known for having a frontal zone in the shape of a spiral, which favors the orderly input of the plant. They are followed by a pulling zone with linear splines, fins or blades which violently lower the stalk between the deck plates (with adjustable separation), thus making it possible for the ears to become free from the stalks.

Figure 1:
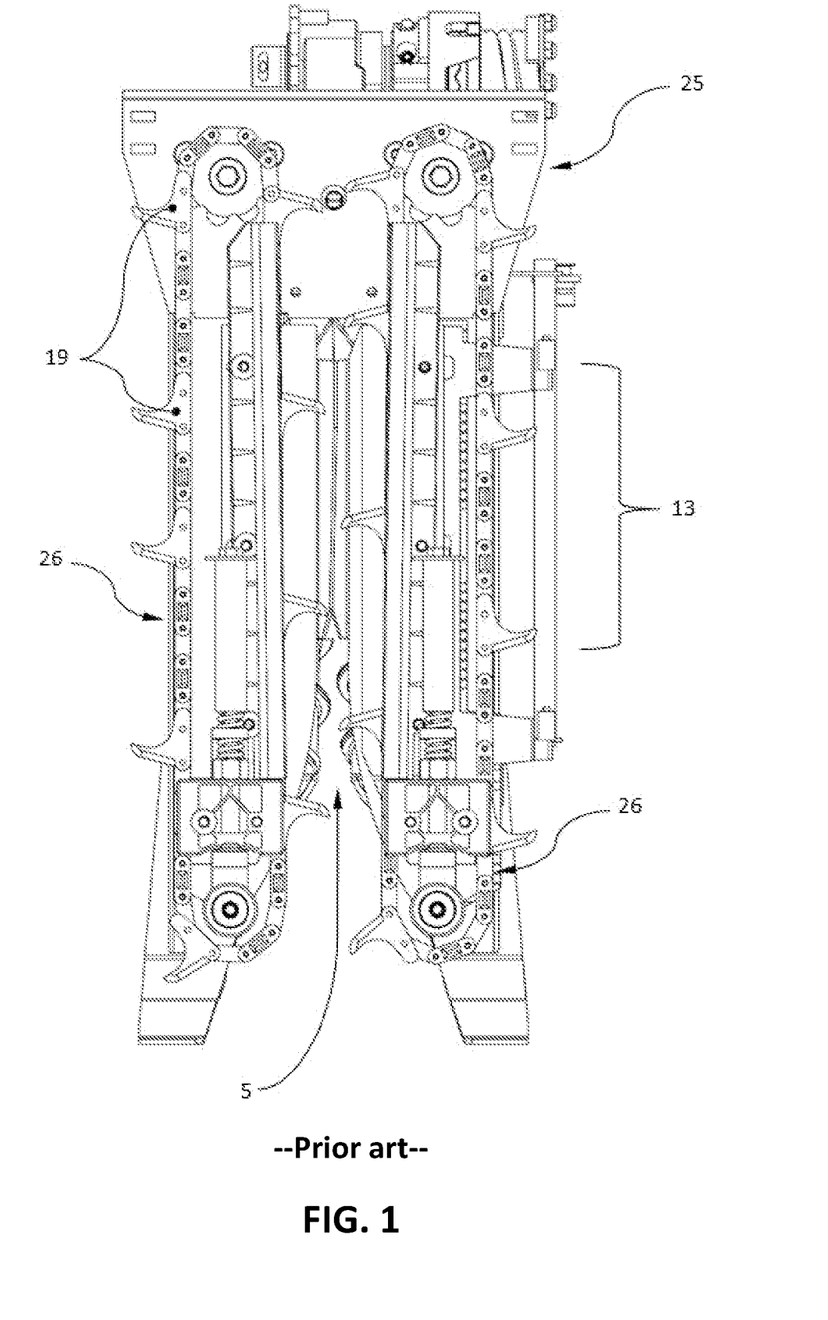
FIG. 1 shows a standard harvesting unit known in the art.

FIG. 1 shows two gathering chains (26) with attachments (19), placed so as to define a slot (processing channel) (5), where the ear separation zone (13) is also shown.

A condition of these types of row harvesting headers is that the separation between the seeded row crops and the separation between the harvesting units must coincide to be successfully harvested. However, it is very frequent to find crop rows that do not coincide with the harvesting units' slots, as it can be seen in FIG. 2. This could happen for different reasons: when the number of rows in the seed drill equipment is not the same than in the harvester header, ears are lost because the times that the seed drill equipment passed through the lot show a shift between one another, creating errors in distances between the planted rows; also when the distance between the planted rows does not match the distance in the header; or when the planting is done in the headland, where the harvest is perpendicular going through plants unevenly planted.

Figure 2:
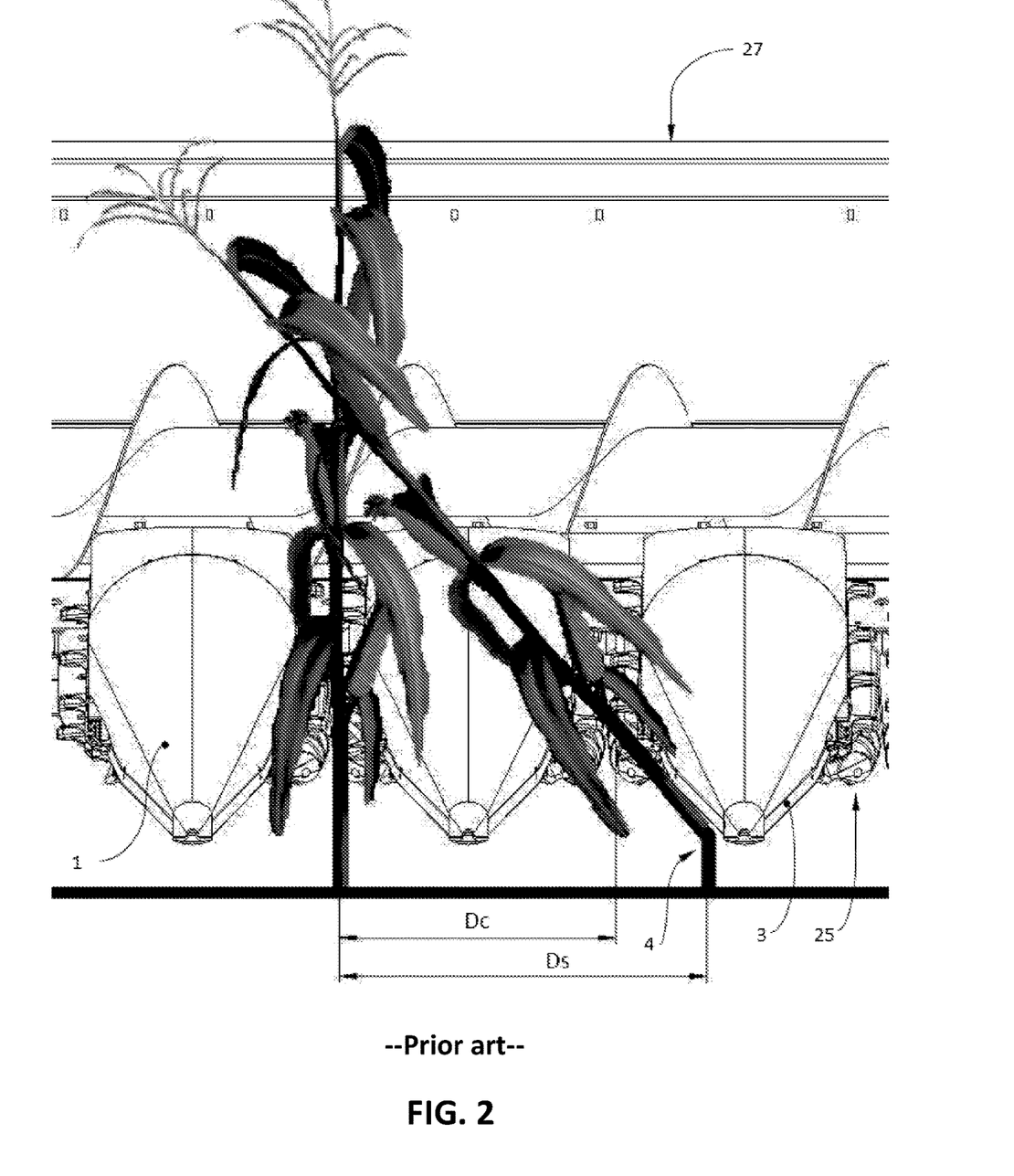
FIG. 2 shows a detailed front view of a harvester header known in the art.

The problem concerns plants showing a great shift or misalignment when the header is going through the crop, these plants are generally deviated by the divisors to be forced to enter the harvesting unit, therefore causing an excessive tilt of the plant. When entering with such tilt, the plant may brake and fall to the ground, or not be taken by the harvester and, thus, a great part of the crop is not picked up by the unit, a consequence of the standard design of the divisors and the harvesting set (FIG. 2). This causes the yield to reduce considerably in those cases where the harvest is done under great shift or misalignment conditions.

FIG. 2 shows a frontal view detail of a header (27) with its harvesting units (25) placed at a distance Dc between centers of two adjacent harvesting units, harvesting on a crop (4) sown at a distance Ds between consecutive rows in a crop field. Where the tilt of the plant (4) produced by a standard divisor (1) can be seen when the distances Dc and Ds are not the same.

The standard design of the divisors (1) from the prior art, as shown in FIGS. 2 and 6a, has a bottom profile closer to the ground (7), their lateral edges (3) come in contact with the plant (4) when it is misaligned, trying to lead it toward the center of the harvesting unit (5). This kind of divisor (1) tries to lead the material from level "H1" close to the ground (7), where the plant (4) does not absorb and does not admit great movement since this is its most resistant part. Deviating the plant (4) from this height "H1" generates a greater tilt, with the risk of the plant falling and no possibilities of picking it up.

There are related documents which try to solve these problems, a patent document related to the divisor point published as US2015068179A1. Where what is revealed is a divisor containing cuts in its lateral sides; it is a modified standard divisor working together with a harvesting unit revealed in the patent document AR074937A1. In the latter, a pair of gathering chains are mentioned, one mounted on each arm of the unit frame (known technique) where each gathering chain opens on its frontal end to create a greater feeder to capture misaligned plants.

Document EP2862433A1 describes a crop divisor with non-vertical lateral sides tapered on their bottom part. They can be: flat, concave or convex, with the purpose of reducing bending on the plant. However, this invention only refers to improvements on the divisor, and does not improve the misaligned plants transition from the divisor to the gathering chains. On is back part, on the front of the chains, the divisor has a bulbous shape; this surface can produce impact with the plants delaying the feed and reducing its efficiency. Also, this shape gives it a higher constructional complexity.

The invention revealed in these presents establishes improvements over what is known. Placing a device with mobile and fixed elements to guide the misaligned crop on the frontal part of a harvesting unit. This has the advantage, compared to the gathering chain, of freeing the function of guiding stalks with the rest of the procedure, configuring optimal feed speeds or number of attachments necessary for each stage. Instead, using the same gathering element to the two functions (guiding the stalks and transporting the ears, as is described in document AR074937A1) may have deficiencies in the guiding stalks stage, because the distance between attachments (pass) is bound to the size or a maize ear where, over said stage it would be more advantageous to have a lesser gap between attachments. Also another advantage is to work with the guiding elements at a greater height than the gathering chains, thus generating a lesser bending on the plant.

Besides, this frontal device could be placed on a unit working without gathering chains or with only one chain, actioning the elements (chains or guiding belts) with electric, hydraulic or otherwise engines, or place them directly on the unit using another concept in plant processing.

Placing a toothed belt as guiding mobile element has the following advantages compared to the use of one chain: less weigh, less vibration, less wear and greater mechanical efficiency (less power consumption).

On the other hand, to work together with this system, it is not necessary to use a line divisor with cuts or castings, simply move the contact border upwards to place the frontal device below thus obtaining benefits regarding the bending produced on the plant. Also its geometry is easy to build, being a standard divisor known without cuts or castings on their lateral sides.

BRIEF DESCRIPTION OF THE INVENTION

Figure 9:
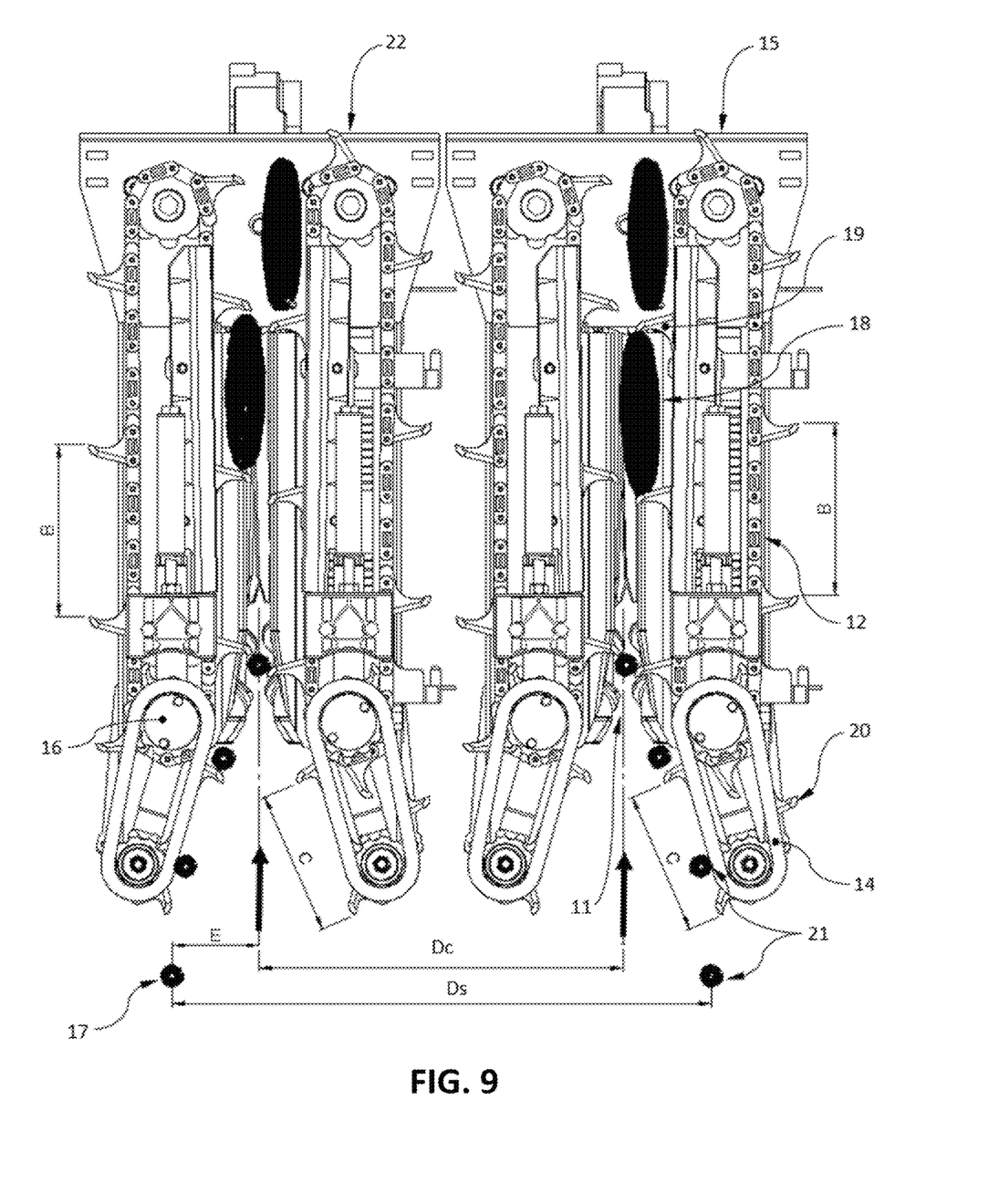
FIG. 9 shows two harvesting units according to an embodiment of this invention.

To face the problems of row harvesting, the objective of this invention is to add a frontal mobile device on a standard corn harvesting unit which contains elements designed to guide the misaligned stalks and lead them efficiently toward the center of a slot. This frontal device has two guiding elements (chain type or conveyor belt type) placed so as to when the two devices are placed adjacently, one at each side of the center of a slot, these guiding elements succeed in creating an opening bigger than the harvesting slot. Thus the deviated stalks are captured and centered by being guided toward the processing channel (FIGS. 3, 5 and 9).

Figure 3:
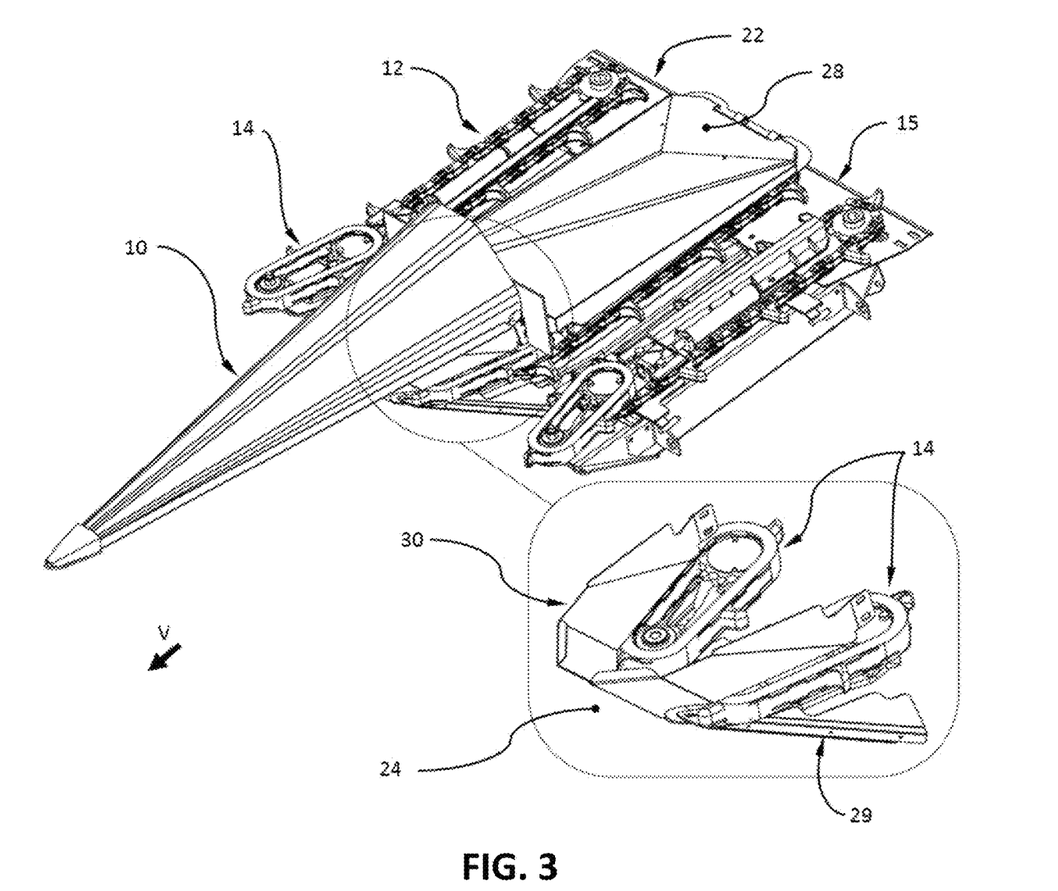
FIG. 3 shows two harvesting units according to an embodiment of this invention.
Figure 4:
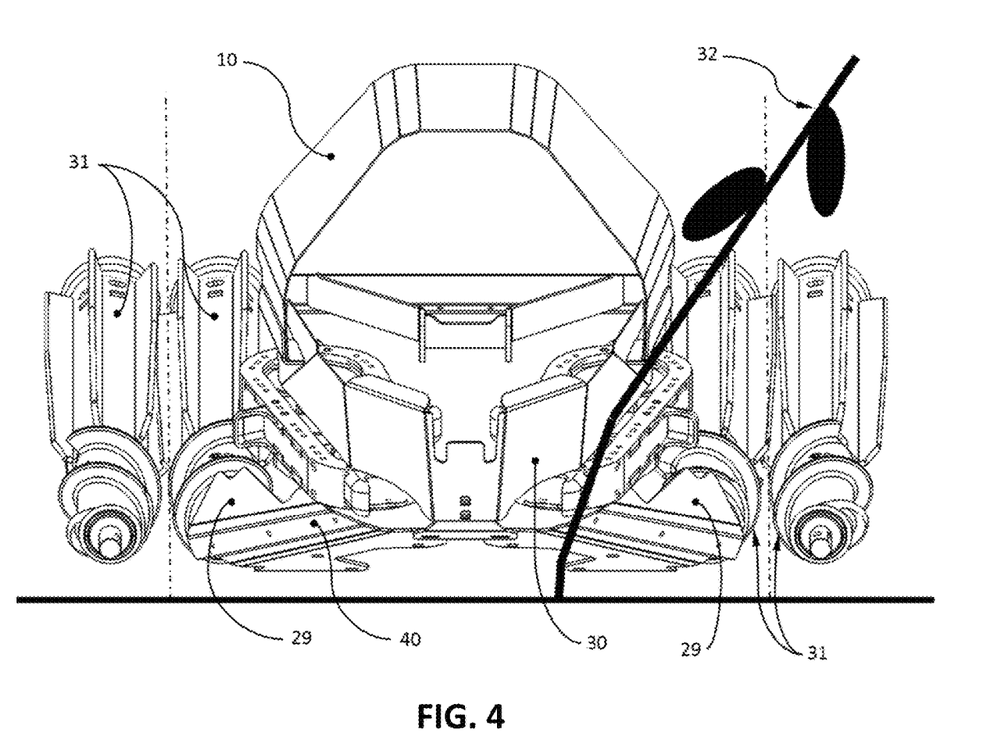
FIG. 4 is a front cross section showing the frontal device according to an embodiment of this invention.
Figure 5:
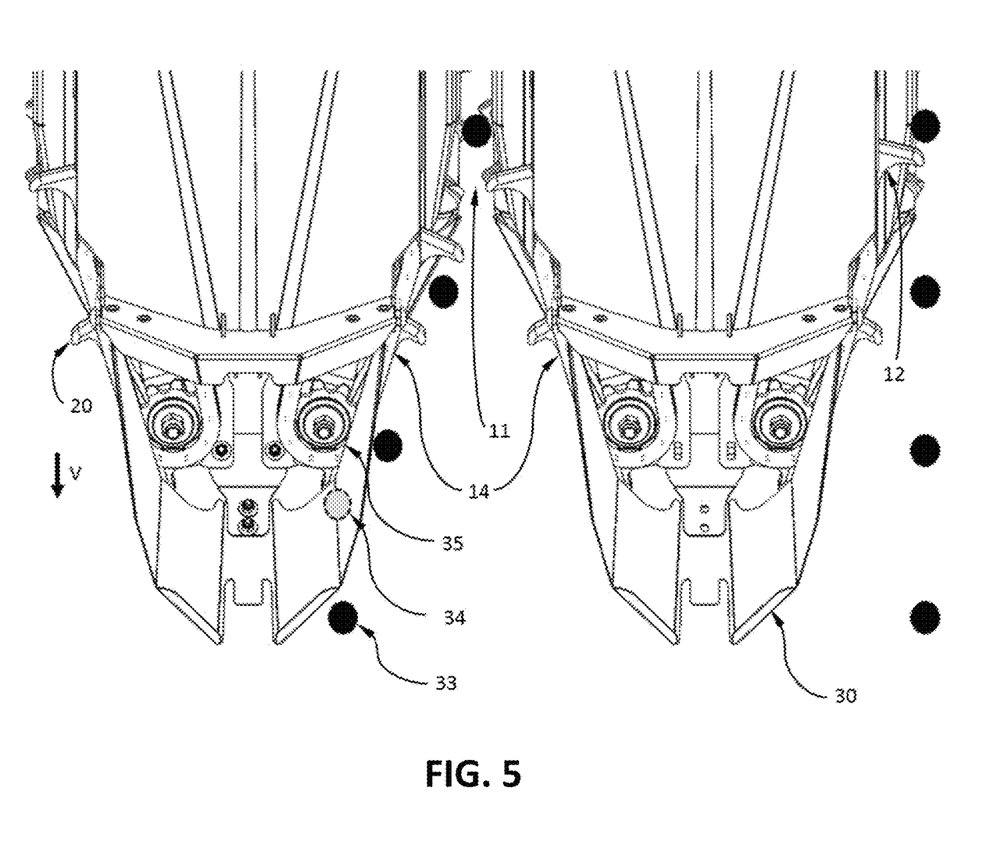
FIG. 5 shows the frontal device according to an embodiment of this invention.

The frontal device, besides being composed by mobile chains or straps, has deflectors which guide the material toward them and deflectors which guide the plants toward the snapping rolls (FIGS. 3, 4 and 5). Both deflectors are favorable sliding surfaces (low friction) to feeding, thus preventing hitches, clashes and tangles in the crops. These deflecting surfaces, working together with the guiding elements (chains or belts), make more efficient the transition of the misaligned plants toward the unit.

To work with this system it is not necessary to use a line divisor with modifications such as cuts on it lateral sides or concave lateral sides, etc. The crop divisor is only disengaged (displaced) from the lower line of the hood a certain distance "F" (FIG. 6b); and the place generated by this elevation of the divisor holds the frontal device for misaligned crops. A front cross section (FIG. 4) shows the shape of the frontal deflector corresponding to the chains, said deflector is conical, tapering to the bottom section, and this shape accompanies the tilt of the misaligned stalks guiding them toward the gathering chains.

A top view (FIG. 5) shows how the frontal device guides the misaligned stalks toward the processing channel. Where the frontal deflector prevents the plants entering misaligned from impacting frontally on the frontal mobile element, thus avoiding contact with the attachments while they rotate transversally to the advance of the harvester. Thus the shaking produced by the plants when entering the harvesting unit is considerably reduced, this translates into a lesser ear separation outside the header and, therefore, improves harvesting efficiency. To sum up, the frontal deflector guides the stalks to deliver them tangentially to the guiding elements, and said elements guide them to deliver them tangentially to the gathering chains, thus avoiding all kinds of sudden jerking, shakes or shocks in the plants that may separate the ears outside the header.

The frontal deflector has also the advantage of making the transition between the divisor and the guiding elements (chains or belts); which keeps the front part of the harvesting unit always covered, regardless of the height that the divisor is regulated at. In other words, the deflector is fixed to the unit and there is relative movements between parts when a height adjustment is done between the deflector and the divisor working with interference.

DETAILED DESCRIPTION OF THE INVENTION

FIG. 3 shows two adjacent harvesting units (15) and (22), with a hood (28) and a line divisor (10) as an example. On said harvesting units the frontal device (24) is placed, shown in the detailed view. Said frontal device (24) consisting of the frontal deflector (30), the guiding elements (14), and the back deflectors (29). The guiding element (14) is a belt or a conveyor chain which circulates between two wheels, and one of said wheels is the one that drives the movement of the guiding element (14).

Figure 7:
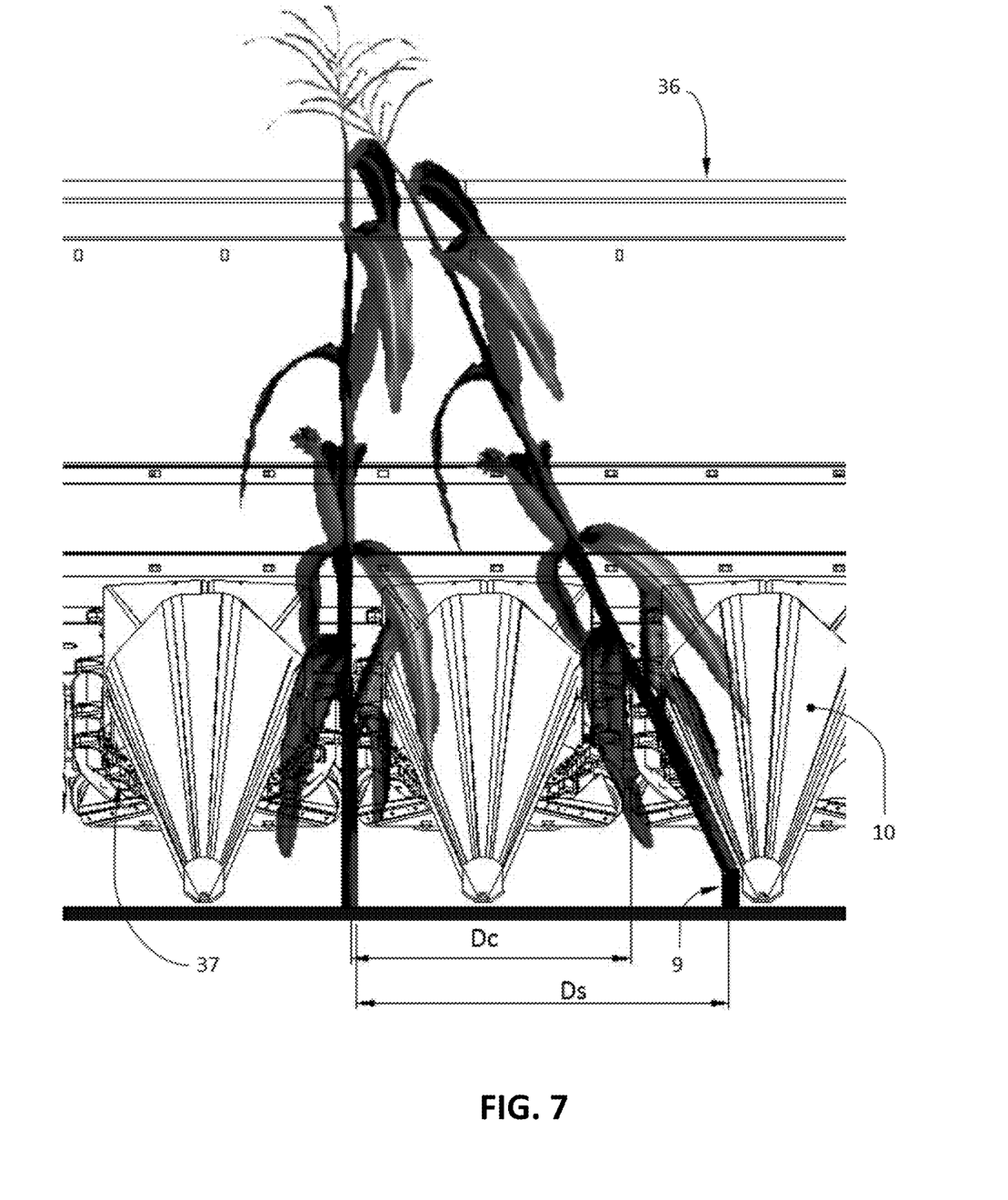
FIG. 7 shows a detailed frontal device according to an embodiment of this invention.

The purpose of one embodiment of this invention is to provide a corn harvester header (36) comprising multiple harvesting units (37) placed adjacently at a certain distance "Dc" between each other (FIG. 7). Where said units (15) (FIGS. 3, 5 and 9) have a slot (11) to process the corn plants entering the header (36), harvesting the ears and separating them from the stalks. Besides, multiple frontal devices (24) are placed in front of and between adjacent harvesting units (15). Each one of said multiple frontal devices (24) is placed in front of and between two adjacent harvesting units, thus being on one side and the other of the slot (11) of the harvesting unit (15). This setting favors, together with the line divisor (10), the input of the plants which are placed a certain distance "Ds" apart between them, and "Ds" is different from "Dc" (FIG. 9). Each frontal device (24) has two guiding elements (chain type or conveyor belt type) (14) placed so as to when two frontal devices (24) are placed adjacently, one at each side of a center slot (11), these guiding elements (14) succeed in creating an opening bigger than the harvesting slot (11). Thus the deviated stalks are captured and centered by being guided toward the processing channel (11).

The purpose of one embodiment of this invention is to provide a line divisor (10) displaced upwards from the articulation point (23) a certain distance "F" (FIG. 6b) already mentioned, this allows having a contact edge with the misaligned crop (6) at a higher height "H2" of clearance from the ground (8). Therefore the misaligned plant (9) is taken at a higher height, thus guiding it toward the slot (11) from its more flexible part. This allows greater movements without damaging the plant. Also, the higher the height, the lesser is the tilt angle generated, so the plant (9) gets to the harvesting unit (15) with a lesser tilt (approximately vertical, FIG. 7).

After the misaligned plants (17) are guided by the line divisor (10) toward the slot (11) in the unit (FIG. 9), it is necessary that the gathering chains (12) take them so they can enter the ear separation zone (13). To favor said feed, as it was already mentioned, a pair of guiding elements (14) (belts or chains) are added in front of the unit (15), one at each side of the slot (11) creating a greater feeder to capture and direct the material delivered by the divisors (10).

Figure 8:
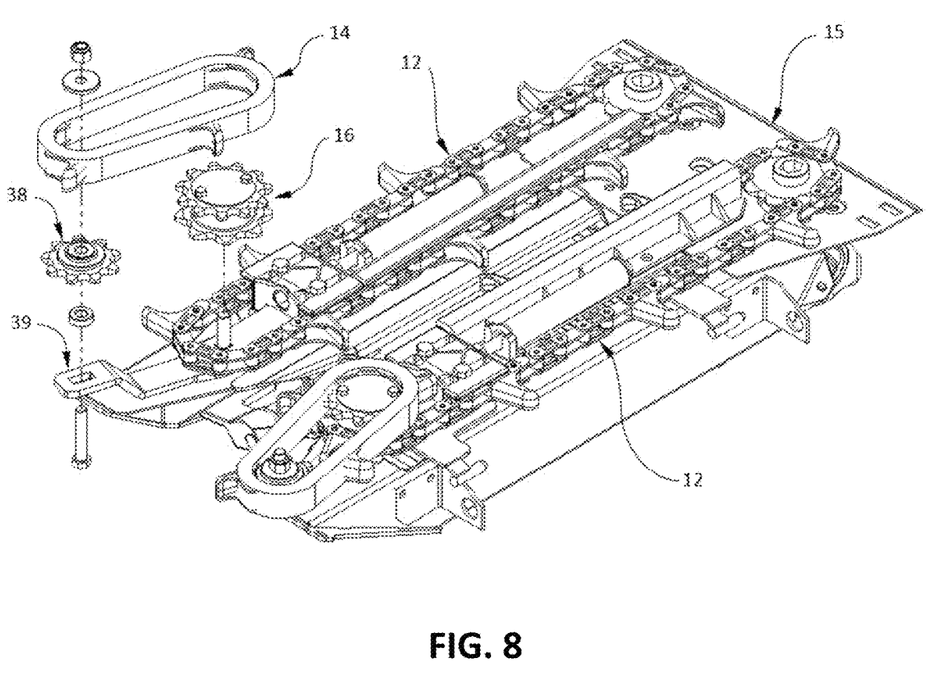
FIG. 8 shows a harvesting unit according to a preferred embodiment of this invention.

According to this invention, this system has the advantage of being able to modify the tangential speed of the guiding elements (14) in relation to the speed of the gathering chain (12), consequently optimizing each function separately. According to one embodiment of this invention, the system comprises a double front wheel (16) driven by the spinning of the gathering chain (12), said double wheel (16) is linked to a gearwheel above, this wheel provides movement to the independent frontal element (14), which works on a plane higher than the gatherer (FIG. 8). Therefore, the guiding element (14) speed can be increased by augmenting the diameter of the superior gearwheel in relation to the diameter of the inferior gearwheel, both wheels rotate at the same revolutions per minute, mechanically joint making a double wheel (16). Conversely, the speed of the guiding element (14) could be reduced by decreasing the diameter of the superior wheel in relation to the diameter of the inferior wheel.

FIG. 9 shows that the distance "B" between the attachments (19) is limited by the average size of an ear of corn (18). This distance needs to be sufficient for an ear (18) to enter between the attachments (19) and be transported. One of the advantages of the system of this invention is that it allows to increase the number of attachments (20) (lesser distance "C") of the guiding elements (14) of stalks (17). Increasing the number of attachments (20) in the guiding elements (14) generates a better feed, faster and continuous, consequence of increasing the frequency with which the attachments (20) come into contact with the plants (17). The distance "C" may be directly related to the distance between consecutive plates in a same crop row (21), therefore a synchronicity is created among the attachments (20) and the input plants (17), thus avoiding delays in entering (11) the unit (15).

Placing these guiding elements (14) in front of the gathering chain (12) has the advantage of being independent from said chain to optimize the guiding function of the misaligned plants (17) without modifying the gathering features of harvested material. In other words, the two mechanisms with different functions are separate, one guides the stalks (17) and the other transports the ears (18) (FIG. 9).

According to another embodiment of this invention, it is possible to place different kinds of transport on the guiding elements (14), which may be a chain similar to the gathering chain (12), or a flexible transport element with or without attachments (20), with no detriment to the ear transport (18) function.

Another advantage of this invention is the possibility to have a greater opening of the guiding elements (14) compared to what is observed in the prior art, thus capturing plants with greater misalignment. As FIG. 9 shows, the size of the frontal opening "E" or the angle set between the guiding elements (14) is limited by the adjacent harvesting unit (22), in the example of this embodiment the size of the attachment (20) used over the guiding elements (14) may be smaller than the one used in the gathering chains (12) to transport ears (18), or may directly do without any attachments (20), this allows to widen the frontal opening "E" of the guiding elements (14) keeping a reduced distance "D" between the harvesting units (15) and (22).

In an embodiment of this invention, the guiding elements (chain or belt) (14) as well as the crop divisor (10) with higher edge (6) are placed in a higher plane than the collecting chain (12). This has the advantage that contact with the plant (9) to guide it happens at a higher height, therefore the tilt is less and, as it was previously explained, the plant is taken by the most flexible part which means less breakage or fallen plants.

Another advantage of this invention is from the constructional point of view. By the embodiment of this invention, it is possible to raise the contact edge (6) of the divisor (10) without needing complex designs with cuts or casts on the crop divider points (1). Achieving this effect without needing a divisor (10) with too much constructional sophistication, on the contrary, a divisor (1) known in the art is used where the joint point (23) is raised. This reduces production times, machining costs and materials. This elevation (23) also allows placing the frontal device (24) previously described.

FIG. 4 is a front cross section showing the frontal device (24) isolated from the rest of the components, only showed with the snapping rolls (31) and the divisor (10). This Figure also shows the shape of the deflector (30), which is conical tapering toward its bottom, with this shape accompanies the tilt of the misaligned stalks (32) guiding them toward the gathering chains (12).

FIG. 5 shows how the frontal device (24) guides the misaligned stalks toward the processing channel (11). Where the frontal deflector (30) prevents the plants entering misaligned (33) from impacting frontally on the frontal mobile element (35); as the stalk shown on the dotted line (34) would impact, thus avoiding contact with the attachments (20) while they rotate transversally to the advance(V).

Figure 6:
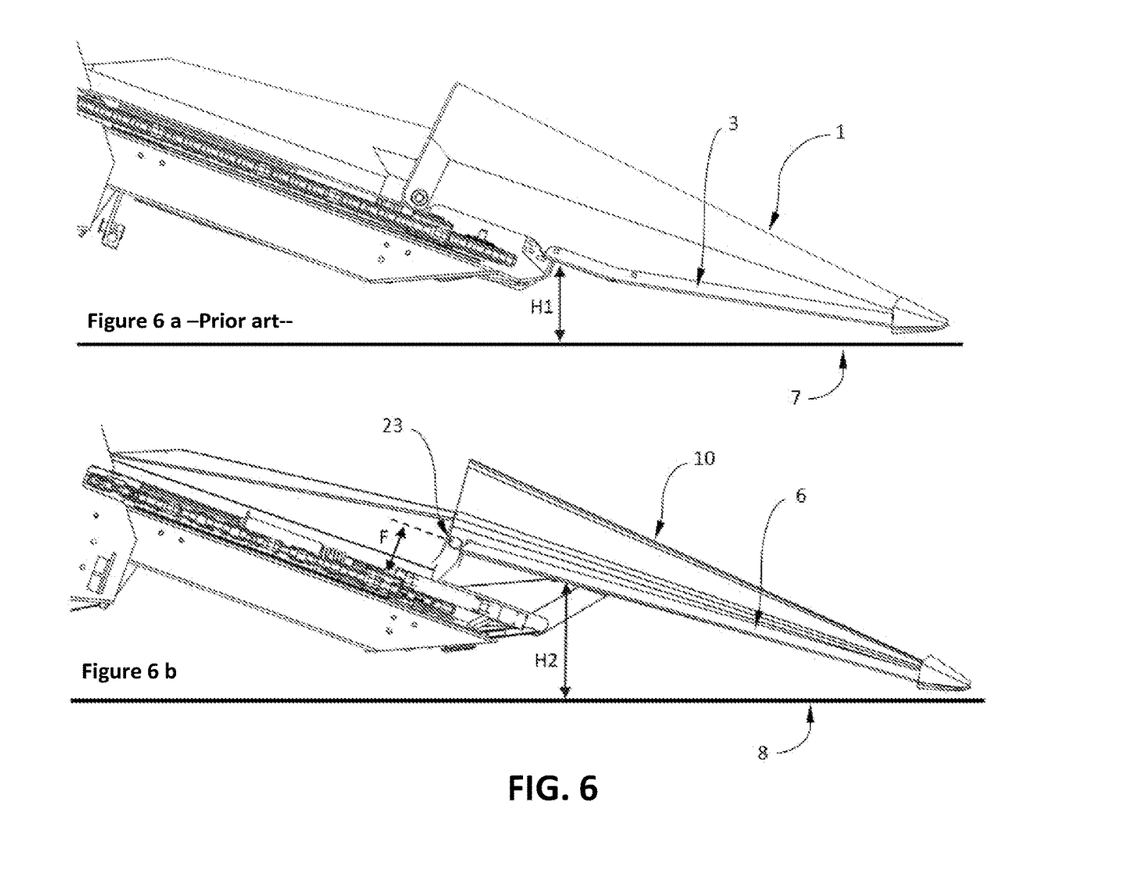
FIG. 6 shows a comparison between the two divisors, one known in the art and the other according to an embodiment of this invention.

FIG. 6 shows the comparison between two divisors, FIG. 6a shows a standard divisor (1) having a contact edge (3) which guides the plant at a height "H1" in relation to the ground (7). FIG. 6b shows a divisor (10) with its joint point (23) displaced a certain distance "F"; this displacement may guide the plant at a height "H", which is considerably higher than "H1".

FIG. 7 shows a frontal view detail of a header (36) with its harvesting units (37) placed at a distance Dc, harvesting on a crop (9) sown at a distance Ds between rows. Where Dc is different from 2 Ds, so this is a misaligned crop. Where it can be seen that the tilt of the plant (9) caused by the placement of the divisor (10) is significantly less according to this invention.

FIG. 8 shows a harvesting unit (15) with the guiding elements (14) mounted on it. Where a preferred mounted configuration is shown according to one embodiment of this invention, with a double wheel (16), a front wheel (38) and a support (39); using the spin of the gathering chain (12) as drive for the guiding element (14).

FIG. 9 shows two adjacent harvesting units (15) and (22) placed at a distance "Dc" between them, working on a crop (17) with a separation "Ds" between rows. The crop (17) misalignment in relation to the center of the slot (11) is represented as distance "E", where it can be seen that the guiding element (14) is the one preventing the impact of the stalks (17) on the front area of the wheel (16); unwanted effect previously mentioned. Also it shows on the gathering chain (12) the attachments (19) separated by a distance "B" to transport the ears (18); on the other hand, there are the deviating elements (14), the attachments (20) separated by a distance "C" to transport the stalks (17).

Figure 10:
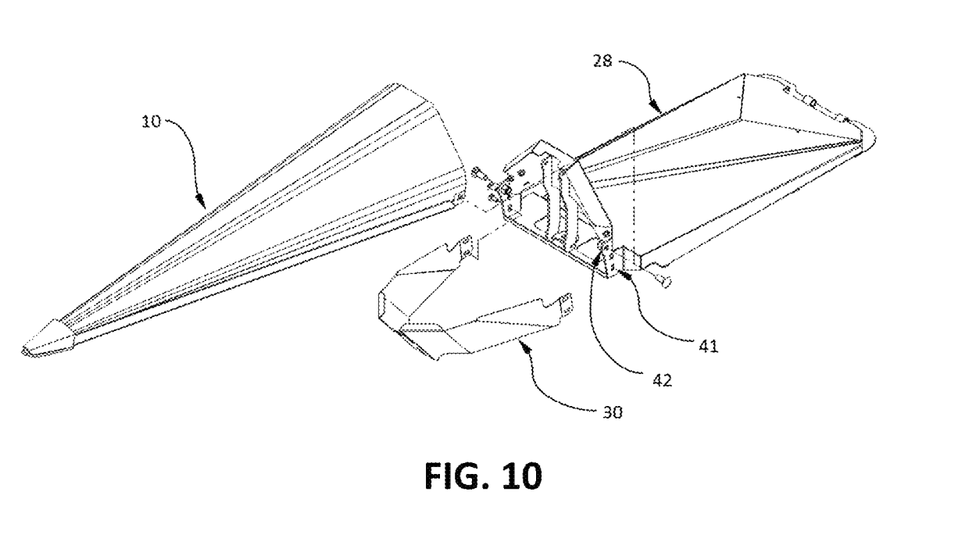
FIG. 10 shows a preferred configuration according to an embodiment of this invention.

FIG. 10 shows a preferred configuration of how the frontal deflector (30) and the line divisor (10) may be mounted on the hood (28). Both elements are joined on the front end of said hood (28), and the divisor (10), as it was already mentioned, displaced upwards and joined to the superior joint point (42), where normally according to the known technique mounting the divisor (10) is done from the inferior joint point (41). This configuration allows to mount the deflector (30) from the frontal device (24) under the divisor (10).

In an embodiment of this invention (FIG. 4), the back deflector (29) is provided with a slider (40) from a material treated or hardened (anti-wear), this deflector (29) is the one that transitions the plants from the mobile guiding elements (14) toward the rolls (31), coming in contact with the stalk on is stronger part. The friction of the plant on this surface is high, without the mentioned hardened slider (40), it may generate a considerable abrasive effect on the element (29) and the consequence may be early wear of the element. This effect on a conventional header is fairly unimportant, but on a header that will be working with misaligned plants with a higher frequency than the conventional, it starts to have much more importance.

In an embodiment of this invention (FIG. 8), the guiding elements (14) may be driven by an electrical actuator coupled on the gearwheel (16). Or said drive may be coupled on the front gearwheel (38). Thus the rotating independence of the guiding elements (14) from the gathering chain (12) is kept.

Although the invention has been described in detail regarding certain preferred embodiments, there are variations and modifications within the scope and spirit of one or more independent aspects of the invention as it is described.

Having thus specially described and determined the nature of this invention and how it shall be put into practice, the following is claimed as exclusive property and right:

1. A corn harvester header comprising:
   (a) multiple harvesting units placed adjacently to each other, where each one of said harvesting units comprises:
      a central slot, wherein the corn plant is processed to extract the ears from the stalks; and
      a pair of gathering chains on each side of the central slot comprising multiple attachments, wherein the attachments on each gathering chain are separated between each other at a distance sufficient enough to introduce an ear longitudinally to the chain; and
      two gearwheels for the gathering chains;
   (b) line divisors, each one placed between two adjacent harvesting units; and
   (c) multiple frontal devices, each one of which is placed in front of and between two adjacent harvesting units, where the frontal devices are located in a plane higher than the gathering chains;
   wherein each one of said multiple frontal devices comprises:
   a pair of guiding elements, where the guiding element is selected from the group of: a chain that comprises multiple attachments or a belt that comprises multiple attachments;
   two wheels; and
   a support;
   wherein one of the guiding elements is placed around said two wheels;
   wherein one of the two wheels drives the guiding element, wherein the tangential speed of the guiding element, the separation of the attachments in the gathering chains, and the number of attachments in the guiding element are configured according to the distance between the plants in the field and to direct the plants to the gathering chains delivered by the divisors;
   wherein one of the gearwheels on the front end of the gathering chains is double and also functions as the wheel driving the rotation of the guiding element of the frontal devices; and
   wherein an opening is created by the angle set between the guiding elements, where the opening is greater than the width of the harvesting slot.

2. The corn harvester header according to claim 1, where the wheel driving the guiding element of the frontal device comprises an electrical actuator.

3. The corn harvester header according to claim 1, wherein the distance between attachments on the gathering chains is different from the distance between the attachments on the guiding elements of the frontal devices.

4. The corn harvester header according to claim 1, where the guiding elements comprise also a frontal deflector and a back deflector.

5. The corn harvester header according to claim 4, wherein the back deflector is provided with a slider made from a treated or hardened anti-wear material.

6. The corn harvester header according to claim 1, which also comprises:
   a hood placed between two adjacent harvesting units covering a gathering chain in each harvesting unit;
   wherein a line divisor is mounted on the front end of said hood, on a joint point raised a distance F higher than the plane of the hood, which provides an elevated contact edge of the line divisor with the crop.

7. The corn harvester header according to claim 1, wherein the size of the attachment in the guided elements is smaller than the size of the attachment in the gathering chains.

* * * * *